United States Patent [19]

Gosselin

[11] Patent Number: 5,112,368
[45] Date of Patent: May 12, 1992

[54] PROCESS FOR REMOVING DUST FROM HIGH TEMPERATURE GAS STREAMS

[75] Inventor: Gérard Gosselin, Charlesbourg, Canada

[73] Assignee: Biothermica International Inc., Montréal, Canada

[21] Appl. No.: 572,653

[22] Filed: Aug. 27, 1990

[51] Int. Cl.$^5$ ............................................. B01D 46/00
[52] U.S. Cl. ............................................. 55/97; 55/96
[58] Field of Search ............... 55/96, 97, 302, 341.1, 55/361, 378, 379, 525

[56] References Cited

U.S. PATENT DOCUMENTS

| | | | |
|---|---|---|---|
| 3,327,866 | 6/1967 | Pall et al. | 210/499 |
| 3,780,872 | 12/1973 | Pall | 55/525 |
| 3,894,855 | 7/1975 | Bidol | 55/378 |
| 4,152,127 | 5/1979 | Kennedy, Jr. | 55/96 |
| 4,247,313 | 1/1981 | Perry, Jr. et al. | 55/379 |
| 4,251,244 | 2/1981 | Evenstad | 55/379 |
| 4,303,425 | 12/1981 | Cox, Jr. | 55/378 |
| 4,336,035 | 6/1982 | Evenstad et al. | 55/97 |
| 4,738,696 | 4/1988 | Staffeld | 55/97 |
| 4,764,355 | 8/1988 | Romey et al. | 55/97 |
| 4,789,387 | 12/1988 | Nemesi et al. | 55/96 |
| 4,818,257 | 4/1989 | Kennedy et al. | 55/525 |
| 4,865,627 | 9/1989 | Dewitz et al. | 55/97 |
| 4,904,282 | 2/1990 | Stuble et al. | 55/96 |

*Primary Examiner*—Jay H. Woo
*Assistant Examiner*—C. Scott Bushey
*Attorney, Agent, or Firm*—ROBIC

[57] ABSTRACT

A collector for filtering gases containing dust. The dust collector includes a metallic woven fabric having pores of a size ranging between 15 and 80 microns. This fabric is for instance a Dutch twill preferably made up of stainless steel. A method for removing and collecting from gases, dust, is also disclosed. Wherein the gases are passed through a metallic woven fabric having pores of a size ranging between 15 and 80 microns. Auxiliaries to remove the particles from the fabric are also disclosed.

7 Claims, 2 Drawing Sheets

PROCESS FOR REMOVING DUST FROM HIGH TEMPERATURE GAS STREAMS

FIELD OF THE INVENTION

The present invention is directed to a dust collector for filtering hot gases containing dust. The invention is also directed to a method for removing and collecting dust from gases containing the same.

BACKGROUND OF THE INVENTION

Various systems are actually used to clean up gases or to remove dust from gases, fabrics for instance such as Nomex fabrics which may be used up to about 400° F., Teflon fabric which may be used up to about 425° F., glass fibre which may be used up to 500° F. All these are expensive and do require special care. In order to prevent any damage by heat for filtering gases having higher temperatures, a cooling step is necessary. On the other hand, cooling removes all the possibilities of being able to use the heat as an energy source. These fabrics are not easy to operate and sometimes, serious problems of maintenance are encountered, particularly when hot particles in the gases to be filtered reach these filters.

Other filtration apparatus are known, such as electrofilters. These normally are resistant to temperature as high as 1,200° F. However, their cost is prohibitive: Their maintenance and operation are in general reliable but electrical installations and sophisticated controls are required.

Another group of filtering systems involves washing. This implies cooling of gases and again inability to use hot gases as an energy source. Their maintenance and operating costs are in general high because of the problems associated with the treatment of the water used for washing.

OBJECT OF THE INVENTION

An object of this invention is to provide a new apparatus and a method for filtering gases containing dust particles, particularly for pulp and paper installations such as bark or wood residues boilers, and the like.

SUMMARY OF THE INVENTION

Broadly stated, the invention is directed to a dust collector for filtering the exhaust gases of a bark or wood residue boiler containing dust, comprising a metallic woven fabric having pores of a size ranging between 15 and 80 microns.

Broadly stated, the invention is also directed to a method for removing and collecting particles from the exhaust gases of a bark or wood residue boiler containing dust particles, comprising passing said gases through a metallic woven fabric having pores of a size ranging between 15 and 80 microns.

BRIEF DESCRIPTION OF THE DRAWINGS

In the drawings which illustrate particular embodiment of the invention.

DETAILED DESCRIPTION OF THE DRAWINGS

Figure 1:
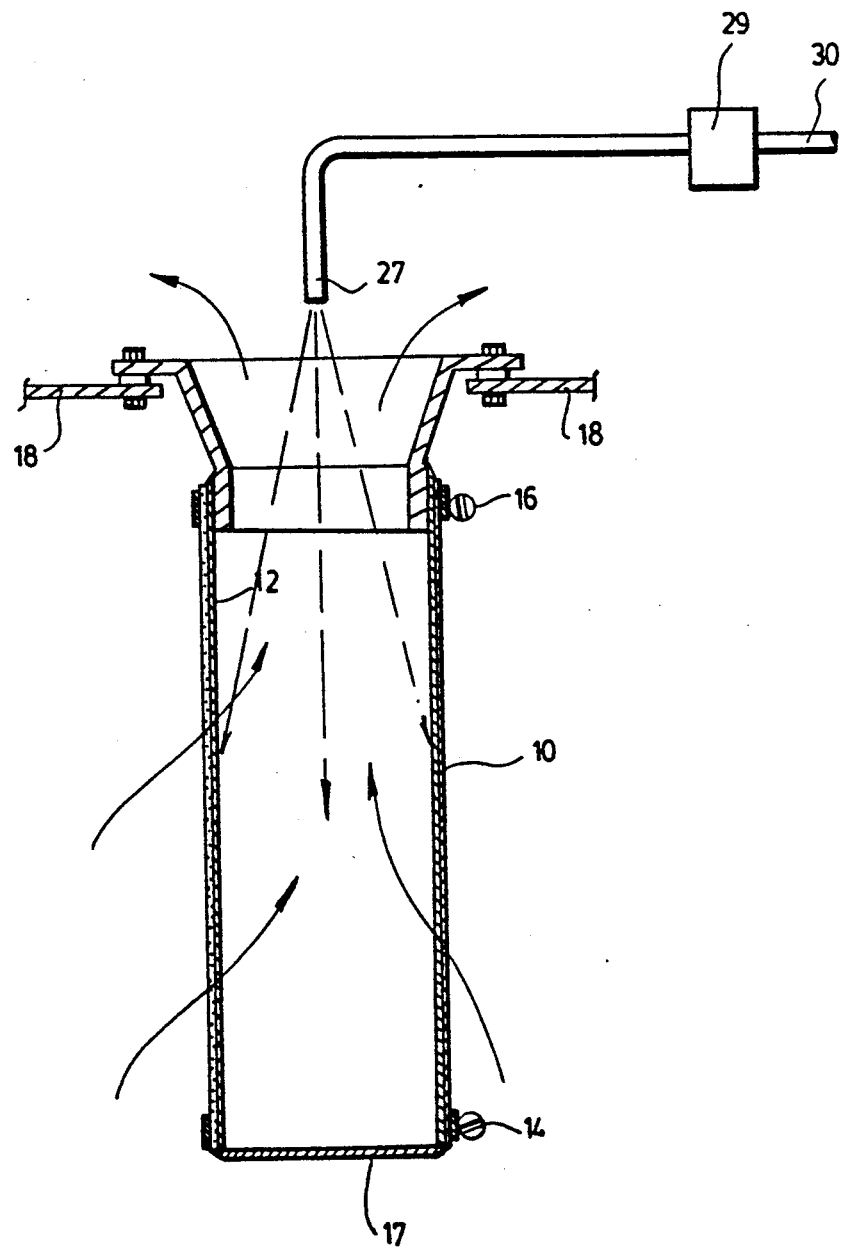
FIG. 1 is an elevation view of a dust collector in accordance with the invention.

Referring now to FIG. 1, the dust collector comprises a metallic woven fabric 10 that is porous and has pores of a size ranging from 15 to 80 microns. Preferably, the fabric is a Dutch twill and fabric, more preferably, a twill of stainless steel woven for instance, a stainless steel no. 304 or 316. The fabric 10 is supported by a metallic structure 12 which may for instance be a circular support, expanded metal structure or other perforated metallic structures free from sharp edges or other supporting means to hold the fabric 10. Preferably, the support is a perforated plate having from 60 to 80% opening. If the support is circular, the fabric 10 may be held as a tubular filtering bag against the circular support by collars 14 and 16. The bottom of the dust collector is a plate 17 joined to the circular support 12. The upper portion of the circular support 12 may also be joined to a bracket 18 leading to a duct or manifold (not shown) acting as an air collector for the filtered air.

Mounted above said fabric along the longitudinal axis of the collector 12 is a pipe 27 ending into a circular orifice. The pipe 27 is operatively connected to a pressurized gasline 30 (such as air line) having means 29 for quick pressure release of said pressurized gas (such as quick acting pneumatic valves) at predetermined short intervals for projecting an undulating gas shock against the walls of the dust collector defined by said fabric, the orifice of pipe 27 producing a venturi effect.

MODE OF OPERATION

As can be seen in FIG. 1, the gases containing dust are passed from the outside periphery of the fabric 10 and move through the metallic support 12 in an upward direction where they are filtered by the fabric 10 and moved inwardly and upwardly into the air collector. The particles adhering along the fabric 10 serve in part to filter the fine particles. When the particles collected form a cake which is hindering the process, or if desired, at intervals that are predetermined, or at any moment when one wishes to release the cake produced on the fabric 10, the gas is released through said circular orifice by actuating said quick release pressure means at intervals to create shock waves for disengaging at least a portion of said filter cakes.

As an example a pressurized gasline of 80 psi was used to deliver in terms of 100 milliseconds 15 psi at a sonic speed in the orifice to create this shock wave.

It should be noted that although one unit is described, it can be a manifold having candle-like filters.

This embodiment illustrates in one of its simplest embodiment the Applicant's invention.

Figure 2:
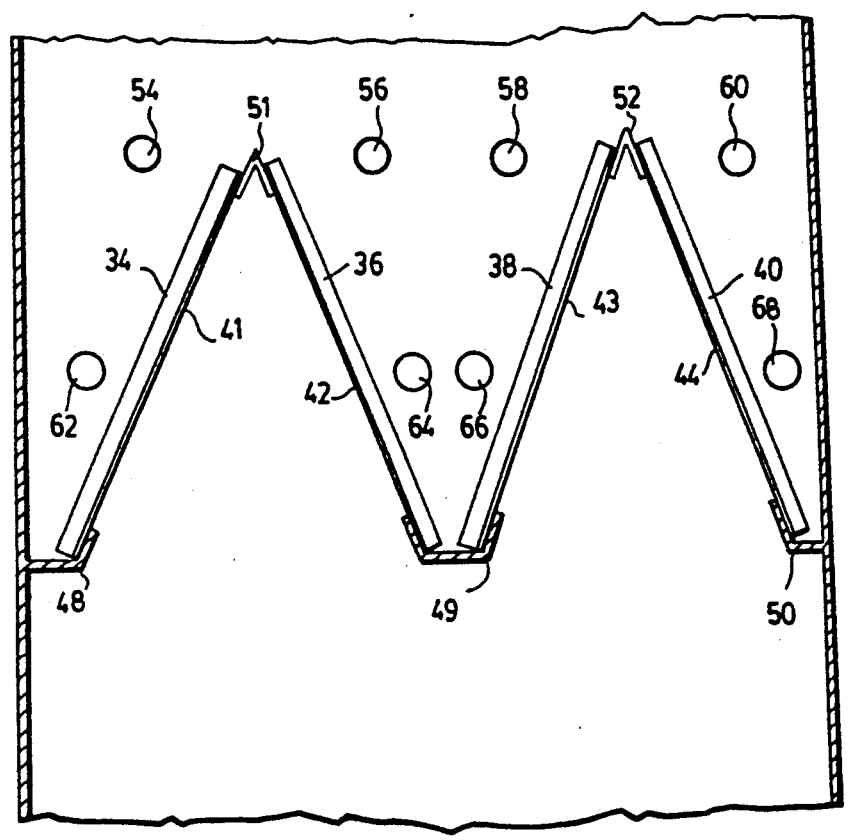
FIG. 2 is an elevation view of another dust collector for collecting dust.

Referring now to FIG. 2, one can easily see a dust collector having a plurality of inclined filters: these filters comprise metallic supports 34, 36, 38 and 40 respectively holding a fabric 41, 42, 43, 44. The supports are mounted on supporting frames 48, 49, 50 and connecting means 51 and 52. The filters are preferably inclined at 25° to 45°, more preferably 30° with respect to the vertical, to allow the filter cake to fall down by gravity, without need of the pressurized gas for its removal. Running along and near the upper portion of said fabrics 41, 42, 43 and 44 are provided tubes such as 54, 56, 58, 60, connected as in FIG. 1 to a pressurized gasline and to a quick pressure release means. The tubes 54, 56, 58 and 60 have slots instead of orifice to increase the efficiency of the removal of the filter cakes.

This apparatus operates in a similar way as in FIG. 1. However, as can be seen, the filtration surface is much larger than in the dust collector described in FIG. 1, and therefore, is preferred.

The dust collectors as shown in FIGS. 1 and 2 for instance may be used for filtering gases ranging from 300 to 1,400° F. It has been found that such dust collectors are able to produce filter cakes enabling filtration of particles as small as 0.3 microns. This is particularly true when such dust collectors are used in cooperation with wood residues and bark boilers. This invention may also be used with other gases containing dust, for instance cement kilns or any high temperature process gas containing dust with uncompletely burned wood particles or or other types of particles.

In a particular instance, this apparatus was used on a bark boiler for filtering the dust particles through a metallic woven fabric defining a porosity between 15 and 80 microns, and preferably 40 and 60. A filter cake was produced on the metallic woven fabric enabling the gases containing up to 10,000 mg/m$^3$ to pass through and thereby produce a gas having up to 50 mg/m$^3$ of dust, said gases passing at a speed of 15 to 100 ft/min.

Although the present invention has been explained hereinabove by way of preferred embodiments thereof, it should be pointed out that any modifications to these preferred embodiments, within the scope of the appended claims, is not deemed to change or alter the nature and scope of the invention.

The embodiments of the invention in which an exclusive property or privilege is claimed are defined as follows:

1. A method for filtering exhaust gases from a bark or wood residue boiler, said gases being at a high temperature of 300 to 1,400° F. and containing up to 10,000 mg/m$^3$ of dust, before being filtered, said method comprising the steps of:

passing said gases through a stainless steel woven fabric mounted on a rigid, supporting metallic structure, said fabric being porous and having pores of a size ranging between 15 and 80 microns; and letting some of said dust, embers and sparks to accumulate on said filter to form a filter cake upstream of the fabric which, in trun, will enable filtration of particles as small as 0.3 micron and thus very substantial reduction of dust and particle concentration in said gases downstream said fabric, said downstream concentration being as low as 50 mg/m$^3$.

2. The method of claim 1, wherein use is made of a Dutch twill made from stainless steel No. 304 or 316, as said fabric.

3. The method of claim 2, wherein said Dutch twill has pores of a size ranging between 40 and 60 microns.

4. The method of claim 3, wherein said gases are passed through said fabric at a speed of 15 to 100 feet/min.

5. The method of claim 1 comprising the additional step of giving shocks at given intervals to said fabric to release at least part of the accumulated filter cake from said fabric.

6. The method of claim 5, wherein said shocks are given by quick releases of a pressurized gas directed towards said fabric from a pressurized gas line located downstream said fabric.

7. The method of claim 6, wherein said fabric and supporting structure are tubular in shape and extend downwardly from an exhaust manifold.

* * * * *